US010821939B2

(12) United States Patent
Saez

(10) Patent No.: US 10,821,939 B2
(45) Date of Patent: Nov. 3, 2020

(54) GPS LOCK

(71) Applicant: Manuel Saez, Brooklyn, NY (US)

(72) Inventor: Manuel Saez, Brooklyn, NY (US)

(*) Notice: Subject to any disclaimer, the term of this patent is extended or adjusted under 35 U.S.C. 154(b) by 0 days.

(21) Appl. No.: 16/565,009

(22) Filed: Sep. 9, 2019

(65) Prior Publication Data
US 2020/0079323 A1 Mar. 12, 2020

Related U.S. Application Data

(60) Provisional application No. 62/728,806, filed on Sep. 9, 2018, provisional application No. 62/728,804, filed on Sep. 9, 2018.

(51) Int. Cl.
*B60R 25/10* (2013.01)
*B60R 25/33* (2013.01)
*E05B 73/00* (2006.01)

(52) U.S. Cl.
CPC ............ *B60R 25/33* (2013.01); *B60R 25/10* (2013.01); *E05B 73/0005* (2013.01); *B60R 2325/101* (2013.01); *B60R 2325/205* (2013.01)

(58) Field of Classification Search
CPC ...................................... B60R 25/33

USPC ................ 340/426.19, 5.6, 5.61, 5.72, 425.5
See application file for complete search history.

(56) References Cited

U.S. PATENT DOCUMENTS

| 2015/0020558 A1* | 1/2015 | Williams | G01S 19/16 70/18 |
| 2016/0221627 A1* | 8/2016 | Hines | B62H 5/20 |
| 2017/0043828 A1* | 2/2017 | Mohamed | B62H 5/141 |

* cited by examiner

*Primary Examiner* — Tai T Nguyen
(74) *Attorney, Agent, or Firm* — David Postolski, Esq.; Gearhart Law LLC

(57) ABSTRACT

An improved global position system (GPS) locking system of a small vehicle is described. The locking system may comprise a plastic case that comprises a GPS module, a cellular communication module (compatible with, for example, GPRS, GSM, LTE, 3G, 4G, or 5G, etc.), at least one motion sensor, at least one gyroscope, at least one buzzer or speaker, at least one microcontroller, at least one battery, and at least one motor with gears. The locking system also may comprise at least one locking bar, a mounting plate, and a security cable. The GPS locking system may operate on Wi-Fi and has BLE and Bluetooth capabilities.

19 Claims, 13 Drawing Sheets

GPS LOCK

CROSS REFERENCE TO RELATED APPLICATION

This application is related to and claims the benefit of U.S. Provisional Patent Application Ser. No. 62/728,806 ("the '806 application"), titled "GPS Lock," which is incorporated by reference herein in its entirety for all purposes.

This application also is related to and claims the benefit of U.S. Provisional Patent Application Ser. No. 62/728,804 ("the '804 application"), titled "Small Vehicle Control User Interface," which is incorporated by reference herein in its entirety for all purposes.

BACKGROUND OF THE INVENTION

Field of the Invention

The present invention relates to a system and method for global positioning systems (GPS) and GPS-equipped locks for small vehicles. The invention relates to systems, methods and apparatus of GPS lock assemblies for small vehicles, and in a particular embodiment, to a GPS lock, such as for use with locking a skateboard or scooter using a GPS-equipped lock.

Description of Related Art

The related art includes, for instance, scooters with upright handlebars, skateboards without handlebars, and other small vehicles, such as remotely-controlled vehicles, including drones and toy cars. There is a need for a rider or user to be able to control the small vehicles that are increasingly popular in today's transportation industry. Use of GPS is increasingly popular in controlling small vehicles and tracking their locations. Theft of small vehicles is an issue that arises in the advent of new and improved small vehicles. Traditional combination locks are easy to clip or cut, and they don't solve the issue of locating the small vehicle is once it is stolen or moved. There is a need for users or riders of small vehicles to not only lock their small vehicles where they may be located, but also to be able to locate the vehicles should they be lost or stolen. As described below, embodiments of the present invention include a GPS lock system for small vehicles, using systems and methods different from those of the prior art systems and methods.

BRIEF SUMMARY OF THE INVENTION

The invention is directed to systems, methods and apparatus involving lock systems for small vehicles, including skateboards and scooters, and, in particular, to a GPS lock integrated with a handle of a scooter.

In accordance with a first aspect of the invention, a GPS-equipped locking system for a small vehicle is disclosed, the system comprising: a GPS-equipped lock having a locking bar adapted to be moved between an unlocked position and a locked position; a mounting plate securely connected to the GPS-equipped lock and adapted to securely connect to the small vehicle; and a security cable having a mounting plate cable end and a locking bar cable end, securely connected to the mounting plate at a mounting plate cable end, and adapted to securely connect to the locking bar when the locking bar is moved into the locked position; wherein the GPS-equipped lock includes: a lock housing that has a front portion and a rear portion that form a locking bar alcove into which the security cable may be locked by the locking bar that locks and unlocks access to the locking bar alcove; a locking bar automated motor that is adapted to automatedly lock and unlock the locking bar; a processor that is adapted to control the locking bar automated motor; a power source coupled to the processor and locking bar automated motor and adapted to power the GPS-equipped lock; a GPS receiver coupled to the processor and adapted to communicate with the processor; and a wireless transceiver coupled to the processor and adapted to communicate with the processor.

In accordance with a second aspect of the invention, a method for unlocking and locking a GPS-equipped locking system for a small vehicle is disclosed, the method comprising: (1) providing the GPS-equipped locking system for the small vehicle, the system comprising: a GPS-equipped lock having a locking bar adapted to be moved between an unlocked position and a locked position; a mounting plate securely connected to the GPS-equipped lock and adapted to be securely connected the small vehicle; and a security cable having a mounting plate cable end and a locking bar cable end, securely connected to the mounting plate at a mounting plate cable end, and adapted to be securely connected to the locking bar when the locking bar is moved into the locked position; wherein the GPS-equipped lock includes: a lock housing that has a front portion and a rear portion that form a locking bar alcove into which the security cable may be locked by the locking bar that locks and unlocks access to the locking bar alcove; a locking bar automated motor that is adapted to automatedly lock and unlock the locking bar; a processor that is adapted to control the locking bar automated motor; a power source coupled to the processor and locking bar automated motor and adapted to power the GPS-equipped lock; a GPS receiver coupled to the processor and adapted to communicate with the processor; and a wireless transceiver coupled to the processor and adapted to communicate with the processor; (2) causing the locking bar to move to the unlocked position by activating the locking bar automated motor to automatedly unlock the locking bar, thereby unlocking the GPS-equipped lock, and thereby unlocking the GPS-equipped locking system; and (3) causing the locking bar to move from the unlocked position to the locked position, thereby locking the GPS-equipped lock, and thereby locking the GPS-equipped locking system.

In accordance with a third aspect of the invention, small vehicle is disclosed comprising: a handle including a control pad and a handle stem, the control pad having a hand grip; a foot deck connected to and supporting a lower end of the handle; a chassis connected to and supporting the foot deck, the chassis including a plurality of axles, a plurality of wheels, a suspension system, and a braking system; and a GPS-equipped locking system; wherein the GPS-equipped locking system comprises: a GPS-equipped lock having a locking bar adapted to be moved between an unlocked position and a locked position; a mounting plate securely connected to the GPS-equipped lock and adapted to be securely connected to the small vehicle; and a security cable having a mounting plate cable end and a locking bar cable end, securely connected to the mounting plate at a mounting plate cable end, and adapted to securely connect to the locking bar when the locking bar is moved into the locked position; wherein the GPS-equipped lock includes: a lock housing that has a front portion and a rear portion that form a locking bar alcove into which the security cable may be locked by the locking bar that locks and unlocks access to the locking bar alcove; a locking bar automated motor that is adapted to automatedly lock and unlock the locking bar; a processor that is adapted to control the locking bar automated motor; a power source coupled to the processor and locking bar automated motor and adapted to power the GPS-equipped lock; a GPS receiver coupled to the processor and adapted to communicate with the processor; and a wireless transceiver coupled to the processor and adapted to communicate with the processor. In some embodiments, the small vehicle further comprises: a small vehicle control user interface system located in the handle; wherein the chassis includes at least one motor; wherein the small vehicle control user interface is coupled to the motor and the braking system, and is adapted to control the motor and the braking system; and wherein the small vehicle control user interface system includes at least one sensor, at least one processor, at least one control input device, a power source, and a communication device.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

By reference to the appended drawings, which illustrate exemplary embodiments of this invention, the detailed description provided below explains in detail various features, advantages and aspects of this invention. As such, features of this invention can be more clearly understood from the following detailed description considered in conjunction with the following drawings, in which the same reference numerals denote the same, similar or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

LISTING OF DRAWING REFERENCE NUMERALS

Figure 1:
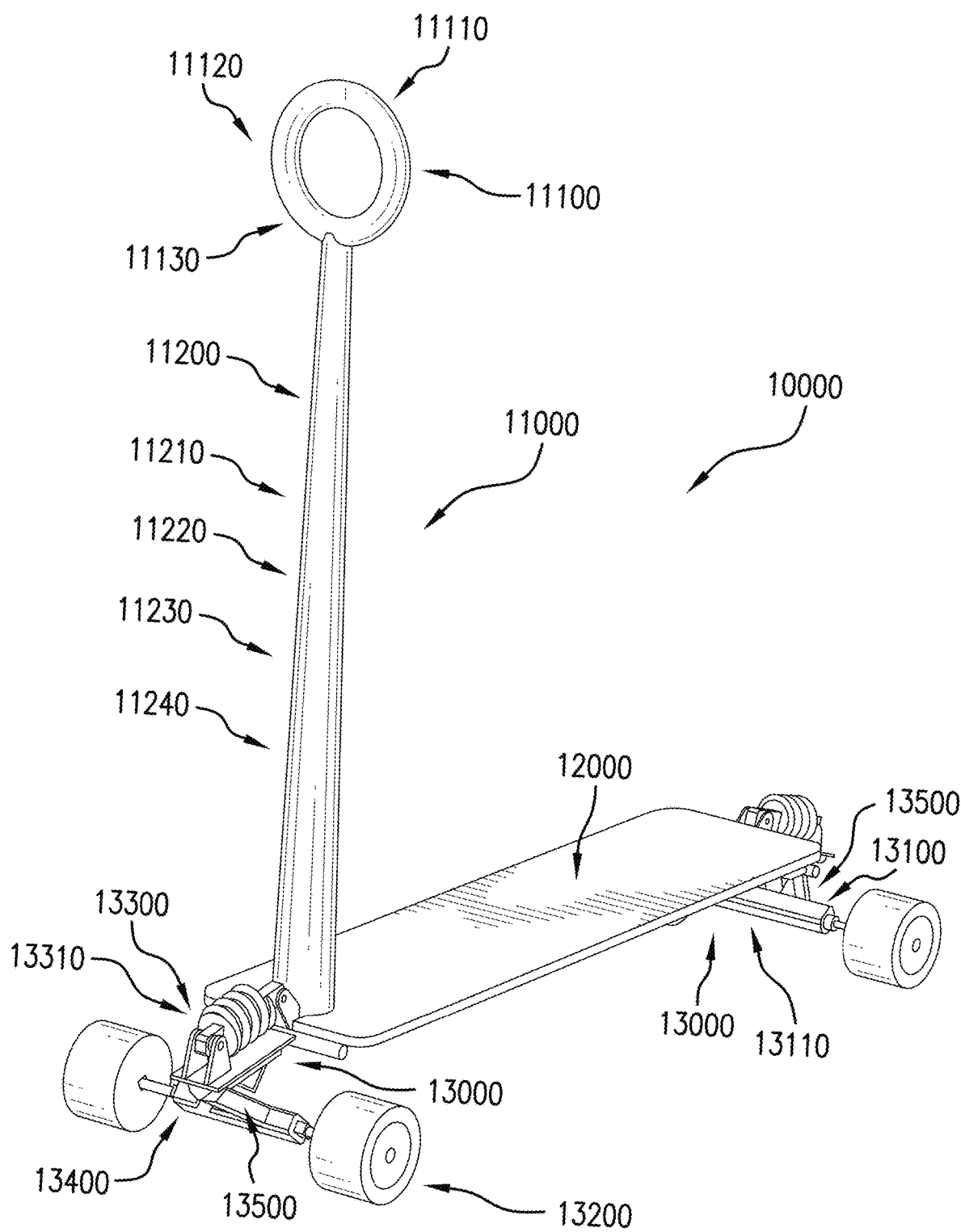
FIG. 1 shows a front side elevation perspective view of an exemplary embodiment of the invention depicting a small vehicle, according to aspects of the invention.
Figure 2A:
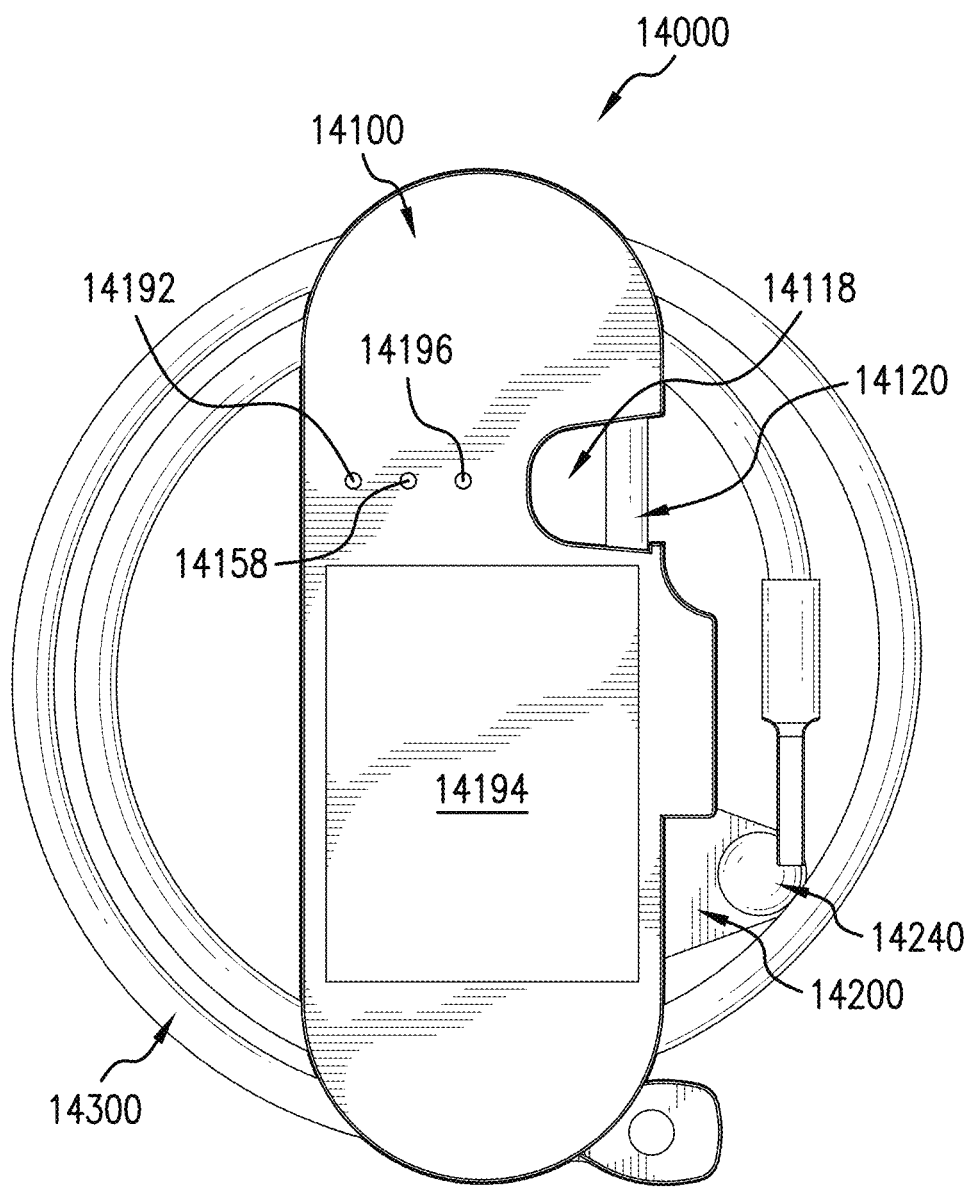
FIGS. 2A-2D show a front elevation view, a back elevation view, a front perspective view, and a back perspective view of an exemplary embodiment of the invention depicting a GPS-equipped locking system for a small vehicle of FIG. 1, according to aspects of the invention.
Figure 2B:
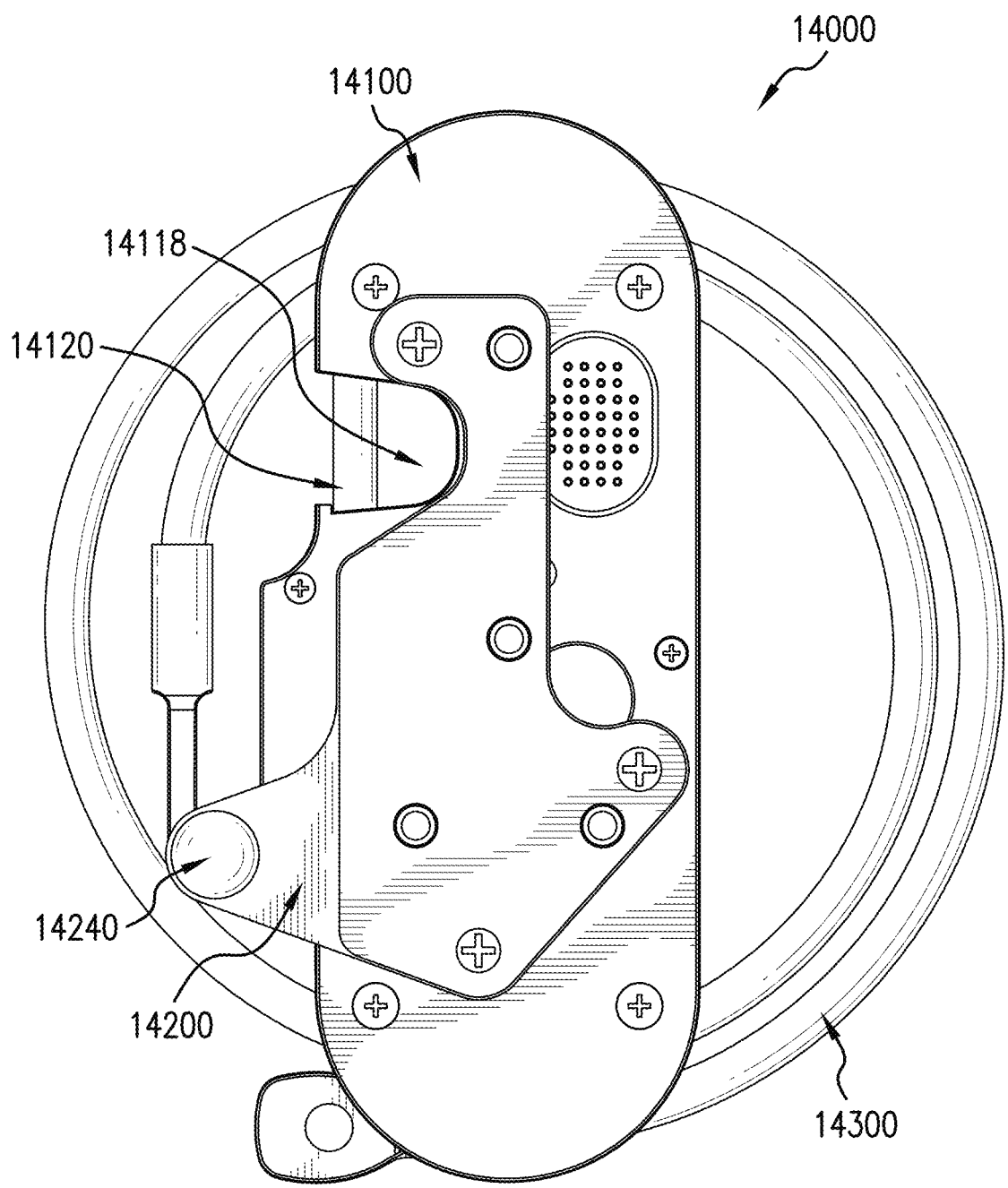
Figure 2C:
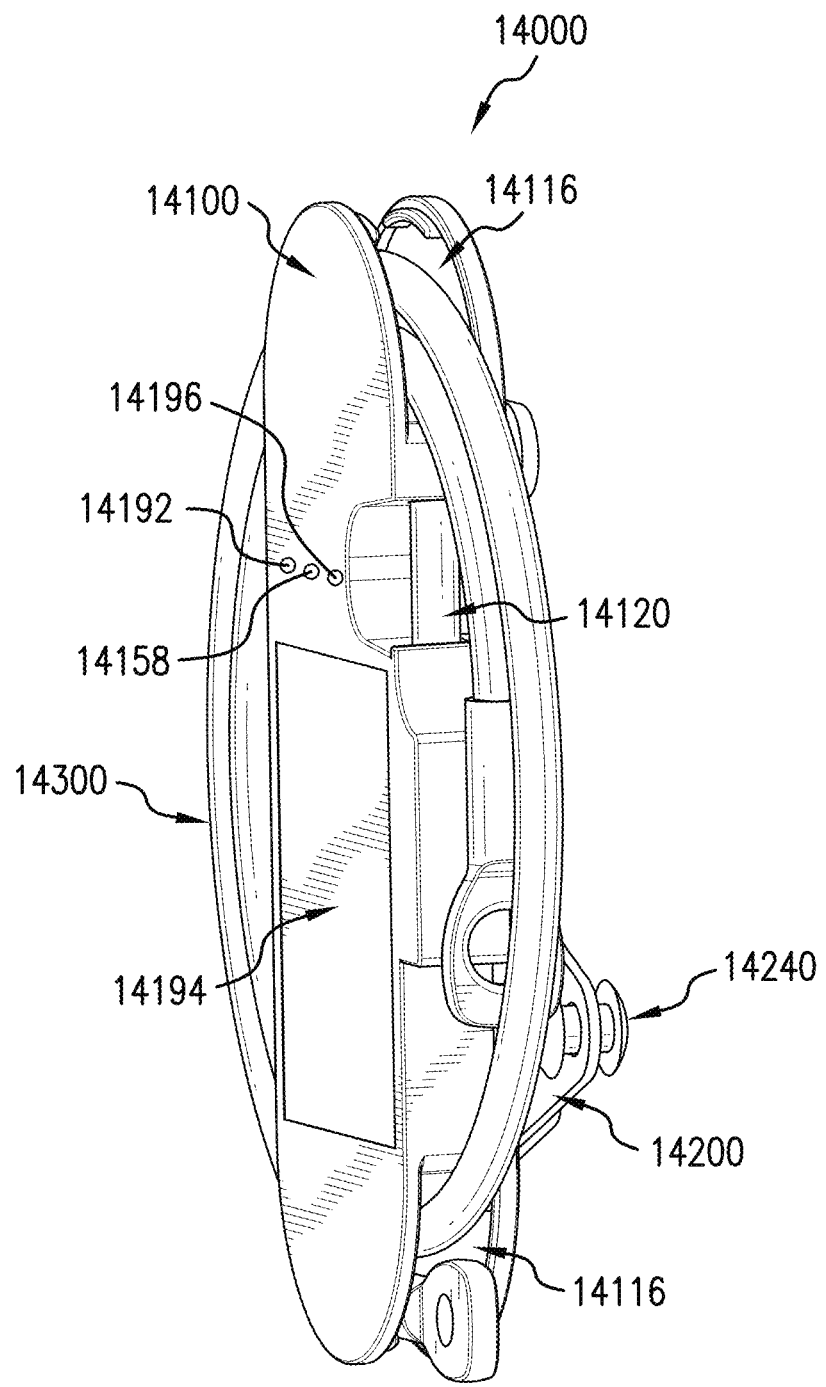
Figure 2D:
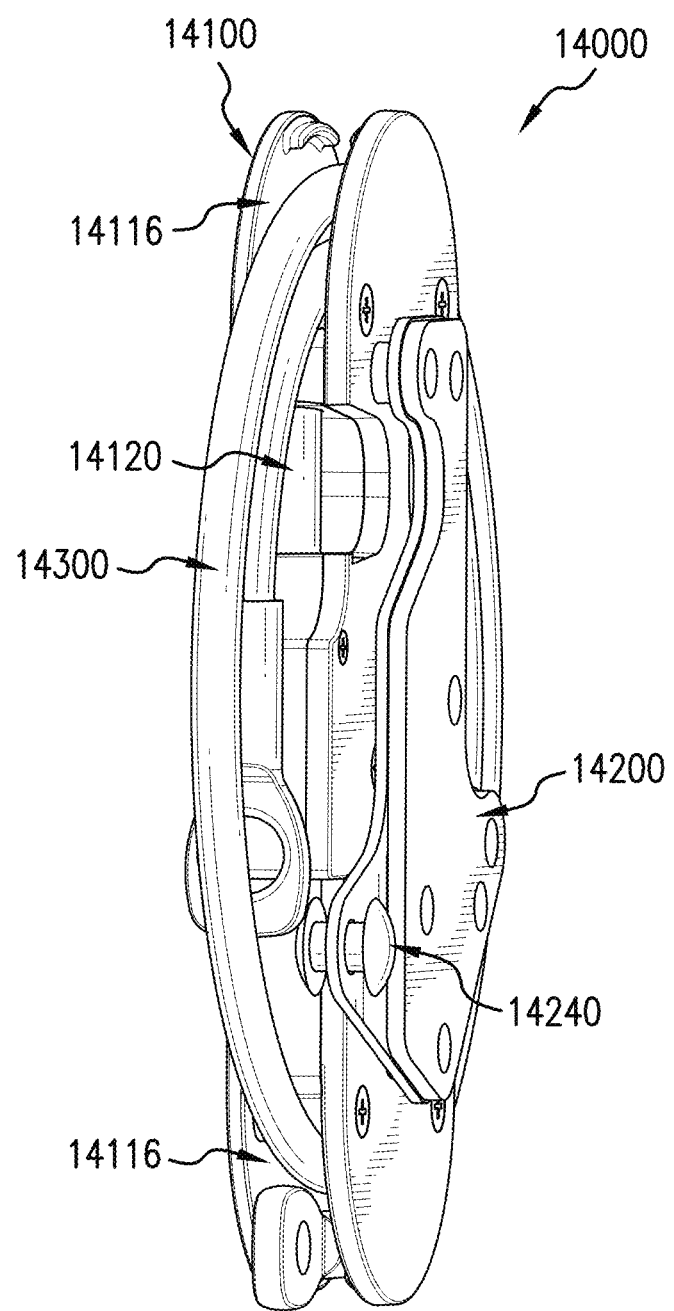

Below are reference numerals denoting the same, similar or comparable elements throughout the drawings and detailed description of the invention:
10000—a small vehicle—such as a hybrid scooter skateboard
  11000—a handle—
    11100—a control pad—
      11110—a handle sensor—
      11120—a control input device—
      11130—a hand grip—such as a ring-shaped grip
    11200—a handle stem—
      11210—a power source—
      11220—a sensor—
      11230—a processor—
      11240—a wireless transceiver—
  12000—a foot deck—
  13000—a chassis—
    13100—an axle—
      13110—a motor—
    13200—a wheel—
    13300—a suspension system—
      13310—a shock-absorbing spring—
    13400—a braking system—
    13500—a truck assembly—
  14000—a GPS-equipped locking system—
    14100—a GPS-equipped lock—
      14110—a lock housing/a hardened case—
        14112—a front portion—
        14114—a rear portion—
        14116—a security cable storage slot—
        14118—a locking bar alcove—
      14120—a locking bar—
      14130—a locking bar manual actuator—
      14140—a locking bar automated motor—
      14150—a processor/a microcontroller—
        14152—a motion sensor/an accelerometer—
        14154—a rotation sensor/a gyroscope—
        14156—a temperature sensor—
        14158—a light sensor—
      14160—a power source/a battery—
      14170—a GPS receiver—
      14180—a wireless transceiver/a cellular communication module—
      14190—a speaker/an audio output device—
        14192—a sound sensor/a microphone—
        14194—a visual output device/a screen—
        14196—a status light/an LED—
    14200—a mounting plate—
      14210—a first side—
      14220—a second side—
      14230—a security cable anchor hole—
      14240—a security cable anchor—
    14300—a security cable—
      14310—a cut-resistant core—
      14320—a flexible sheath/a plastic sleeve—
      14330—a hot wire/a cut-detection tripwire—
      14340—a mounting plate cable end eyelet ferrule—
        14342—an eyelet opening—
        14344—an eyelet body—
      14350—a locking bar cable end eyelet ferrule—
        14352—an eyelet opening—
        14354—an eyelet body—

DETAILED DESCRIPTION OF THE INVENTION

The invention is directed to systems, methods and apparatus involving GPS-equipped locking systems for small vehicles, such as skateboards and scooters.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope, and contemplation of the invention.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

The present invention teaches an improved global position system (GPS)-equipped locking system of a small vehicle. The present invention may be comprised of a hardened plastic or metal case that comprises a GPS module, a cellular communication module (which may be compatible with local wireless protocols, such as GPRS, GSM, LTE, Edge, 3G, 4G, or 5G), at least one motion sensor, at least one gyroscope, at least one buzzer or speaker, at least one microcontroller, at least one battery, and at least one motor with gears. The present invention also may comprise at least one locking bar, a mounting plate, and a security cable. The GPS locking system may operate on Wi-Fi and may include Bluetooth Low-Energy (BLE) and/or Bluetooth capabilities.

The security cable may be made of a plurality of elements. All of the elements may be arranged in any combination and comprise at least one cable comprised of steel in varying thicknesses. The cable may comprise fabrics or strands of cut-resistant materials, such as carbon fiber, Kevlar, or aramid. The security cable may be configured to be cut resistant and may be covered by a plastic or fabric outer sleeve. The GPS lock system may be mechanically configured with a multitude of materials to deter thieves, as the configuration makes it more difficult to cut. A thief will require more time and/or more tools to cut the security cable. In a preferred embodiment, the security cable also may comprise a "hot wire" that connects to the GPS locking system and that triggers and activates an alarm and safety features when the hot wire is cut. The alarm may alert the authorities, the user/rider's mobile phone, and/or other connected device. The "hot wire" may also act to disengage the small vehicle suspension system or the control pad of the small vehicle, thereby locking the wheels of the small vehicle, so as to render the small vehicle unusable or immovable. This locking feature can be overridden by the user/rider alone. The alarm may also send a GPA location to the small vehicle owner so that the owner may track the location of the small vehicle.

The present invention may work in conjunction with an application (app) on a user's mobile device (e.g., smartphone or tablet) or other connected device. The app may require a user to set up and connect to the small vehicle, so that the user may control the GPS locking system, control pad, and/or other systems of the vehicle. The app may require a log in from the user, who may then have the option to open or arm the lock. The app may communicate with the GPS-equipped lock directly and locally, such as through a BLE data connection. In addition, or in the alternative, the app may communicate with the GPS-equipped lock indirectly, such as through a Wi-Fi or cellular data connection that goes over a wireless access point and remote server between the app and the GPS-equipped lock. Whether communication is direct or indirect, the GPS-equipped lock is adapted to use the wireless transceiver to communicate with a remote computer (e.g., app or server) for communication of status information of the small vehicle and for operation of the GPS-equipped lock based on instructions received from the remote computer. This remote operation and control of the lock may then allow the user to communicate with the operator of the small vehicle or other authorized users of the small vehicle. The app may allow the user of the small vehicle to manage the subleasing or authorized uses of the vehicle. The app may gather data and allow a user to track the usage and operation of the vehicle. Data points that may be collected might include, distance driven, mileage, speed, and other statistics. The app may also have a graphical user interface and map location of the vehicle. The app may report where the vehicle is, and the lock status of in either a locked or unlocked stage.

The app and GPS lock system may be part of a larger system, which comprises at least one processor and at least one server. The server may include software adapted to manage operation of at least one small vehicle, and be used by the operator for tracking and managing at least one of the locks that may be attached to one or more of the small vehicles in the user's fleet. The server may also allow a user to open the lock, if needed, to gather data and statistics of usage, and to cut off power of the vehicle, if needed, such as in case the vehicle is stolen, or when needed for other reasons. The present invention's lock system may allow a user to sublease the vehicle. The plastic case of the present invention may be configured to store the security cable. In a preferred embodiment, the plastic case may be waterproof. The present invention may be independent of but secured to the small vehicle, or may be wired to and integrated into the small vehicle. The present invention may be configured wirelessly as part of a larger system of small vehicles or other vehicles on the road as part of a larger smart city network.

The GPS lock system may either be attached to the small vehicle, be a freestanding device that can be easily attached and secured to the small vehicle, or be independent and freestanding to the small vehicle. When freestanding, the lock system is not attached to anything, thus the user can carry the locking system on his self or property, retrieve it and activate the lock of the vehicle. When the lock system is attachable to a vehicle, it can be attached to vehicles (electric or not) such as a bike, motorcycle scooter, bicycle, cargo bikes, delivery bikes, cars, trucks, and other objects such as shipping containers, packages, and other things that need to be secured while moving. In another embodiment, the lock may be connected to a camera system that can record audio and visual events surrounding the small vehicle and transmit the audio-video data to the user.

The lock may have its own battery, and if attached to an electric vehicle or a vehicle with a battery, the lock may draw power from the vehicle's battery. In another embodiment, the lock may be attached to an electric vehicle, and the lock may cut the power or disable the electric vehicle, to which the lock is attached, when in the locked status or alarm-triggered status. The lock may have a security cable attached, or not. If not, the user may use his/her own cable to secure the vehicle to a fixed object, like a tree, a post sign, etc. When the lock is armed and is moved or disturbed, it may trigger an alarm that goes to the user, to the operator server, and/or to another predetermined recipient, such as the police. In another embodiment, the lock when triggered may make a loud sound. The lock system of the present invention may be armed by the user or by the operator.

The control pad is comprised of various sensors, including but not limited to sensors that measure pressure, temperature, speed (accelerometer) and rotation (gyroscope). Some sensors may be positioned elsewhere on the small vehicle, such as on a handle stem, to the extent that the position of the sensor does not impact the sensing of the criterion being sensed. The control pad is part of a larger system that comprises a processor, the sensors, and wired and/or wireless capabilities, through a communication device, such as communication chips (e.g., USB port), and/or a wireless transceiver, enabling, for instance, Bluetooth, Wi-Fi, Near-Field Communication (NFC), and/or Bluetooth Low-Energy (BLE). The control pad is powered through a power source, such as a battery, solar cells, or induction. The power source may include a rechargeable battery (e.g., lithium ion battery), and likewise may include a charging circuit to recharge the battery. The processor may be adapted to handle or be interoperable with common operating systems, including iOS, Android, Microsoft Windows, etc., and be adapted to be interoperable with a related app running on such an operating system, such as a smartphone app.

The physical control, with which a user interfaces, comprises a control pad with control input devices, such as switches, buttons, sliders and digital or touch-sensitive pad, or touch-sensitive screen. The disclosed invention allows a user to connect the small vehicle to other wireless or plugged-in devices, thus allowing a user to have control and access to all the user's connected small vehicle devices.

The control pad is a means for a rider to control a small vehicle using his/her hands or other body parts. The control pad may have a hand grip having the shape of a donut, a ring, a bar/rod, a handlebar for one or two hands, a sphere or a surface. The control pad may be sensitive to touch and may interpret a user's motion to receive the desired action request. For example, to move the small vehicle forward, a user may press, push, or pull the control pad forward. Levels of user interaction may determine the control of the vehicle; for example, the harder the pressure exerted by the user on the control pad, the faster the small vehicle moves. Pulling the control pad back from a forward position may cause the small vehicle to stop. The harder the pressure applied to move the control pad back from a forward position, the harder or faster the small vehicle stops. To reverse the small vehicle, a user may continue to pull the control pad with pressure, thereby instructing the small vehicle to go backwards, i.e., in reverse. Similarly, pressing, pulling, or exerting pressure on the control pad to the left instructs the processor to instruct the small vehicle to move to the left. Similarly, pressing, pulling, or exerting pressure on the control pad to the right instructs the processor to instruct the small vehicle to move to the right.

The control pad may also be comprised to understand and process haptic feedback from and to the user or rider on the small vehicle, such as through a haptic input sensor and/or a haptic output device, such as a vibration generator. The control pad may be a self-standing system or it may connect to other systems in the vehicle such as temperature control or any other electrical or mechanical systems in the small vehicle. FIG. 1 shows the control pad being used on a small vehicle such as a hybrid scooter-skateboard, but the control pad can be used on mini cars, driverless cars, electric bikes and scooters and any similar type of vehicle.

Exemplary Embodiments of the Invention

Referring to the Figures, a small vehicle 10000 may include a handle 11000, a foot deck 12000, and a chassis 13000.

Referring to FIG. 1, FIG. 1 shows a front side elevation perspective view of an exemplary embodiment of the invention depicting a small vehicle 10000 having an integrated control pad, according to aspects of the invention. As depicted, the small vehicle 10000 comprises a hybrid scooter skateboard having a handle 11000, a foot deck 12000, and a chassis 13000.

The handle 11000 may include a control pad 11100 and a handle stem 11200. The control pad 11100 may include and/or contain one or more handle sensors 11110, one or more control input devices 11120, and a hand grip 11130, such as a ring-shaped grip. The control pad 11100 may comprise a metal, wood, plastic, or composite structure, such as the depicted ring-shaped hand grip 11130, that may be hollow, may contain hidden from view the handle sensors 11110, and may have the control input devices 11120 on the surface of the control pad 11100. The handle stem 11200 may include and contain, for instance, a power source 11210, one or more sensors 11220, one or more processors 11230, and one or more wireless transceivers 11240. In some embodiments, the control pad 11100 itself may include the power source 11210, the other sensors 11220, the processors 11230, and the wireless transceivers 11240. In some embodiments, both the control pad 11100 and the handle stem 11200 include some combination of the power source 11210, the other sensors 11220, the processors 11230, and the wireless transceivers 11240. The handle stem 11200 may comprise a metal, wood, plastic, or composite support bar, such as an elongated cone or tapered cylinder, that may be hollow and contain hidden from view the power source 11210, the sensors 11220, the processors 11230, and the wireless transceivers 11240.

The foot deck 12000 may comprise a metal, wood, plastic, or composite elongated substrate adapted to hold the weight of a user riding the small vehicle 10000. The foot deck 12000 is connected to and supporting a lower end of the handle 11000. The foot deck 12000 also may be adapted to stably support the handle 11000 as pressure is applied by the user to the handle 11000 during riding. The foot deck 12000 similarly may be adapted to stably support the chassis 13000 as weight is applied by the user during riding and the weight is transferred to the chassis 13000.

The chassis 13000 is connected to and supporting the foot deck 12000. The chassis 13000 may include a plurality of axles 13100, possibly one or more motors 13110 integrated in the chassis 13000, a plurality of wheels 13200, a suspension system 13300 that may include, for instance, a plurality of shock-absorbing springs 13310, possibly a braking system 13400 that may include, for instance, disc brakes, or capacitive brakes that have an electric motor 13110 work in reverse to slow the vehicle 10000 by recharging the power source 11210, and at least one truck assembly 13500 that supports the axles 13100 and suspension system 13300.

In some embodiments, the power source 11210 is adapted to provide electrical power to the handle sensors 11110, the control input devices 11120, the sensors 11220, the processors 11230, the wireless transceivers 11240, the motors 13110, and the braking system 13400. In some embodiments, the processors 11230 are electronically coupled to and adapted to electronically interact with the handle sensors 11110, the control input devices 11120, the power source 11210, the sensors 11220, the wireless transceivers 11240, the motors 13110, and the braking system 13400.

Referring to FIGS. 2A-2D, FIGS. 2A-2D show a front elevation view, a back elevation view, a front perspective view, and a back perspective view of an exemplary embodiment of the invention depicting a GPS-equipped locking system 14000 for a small vehicle 10000 of FIG. 1, according to aspects of the invention. In particular, FIGS. 2A-2D show a GPS-equipped locking system 14000 that includes a GPS-equipped lock 14100, a mounting plate 14200, and a security cable 14300.

Figure 3A:
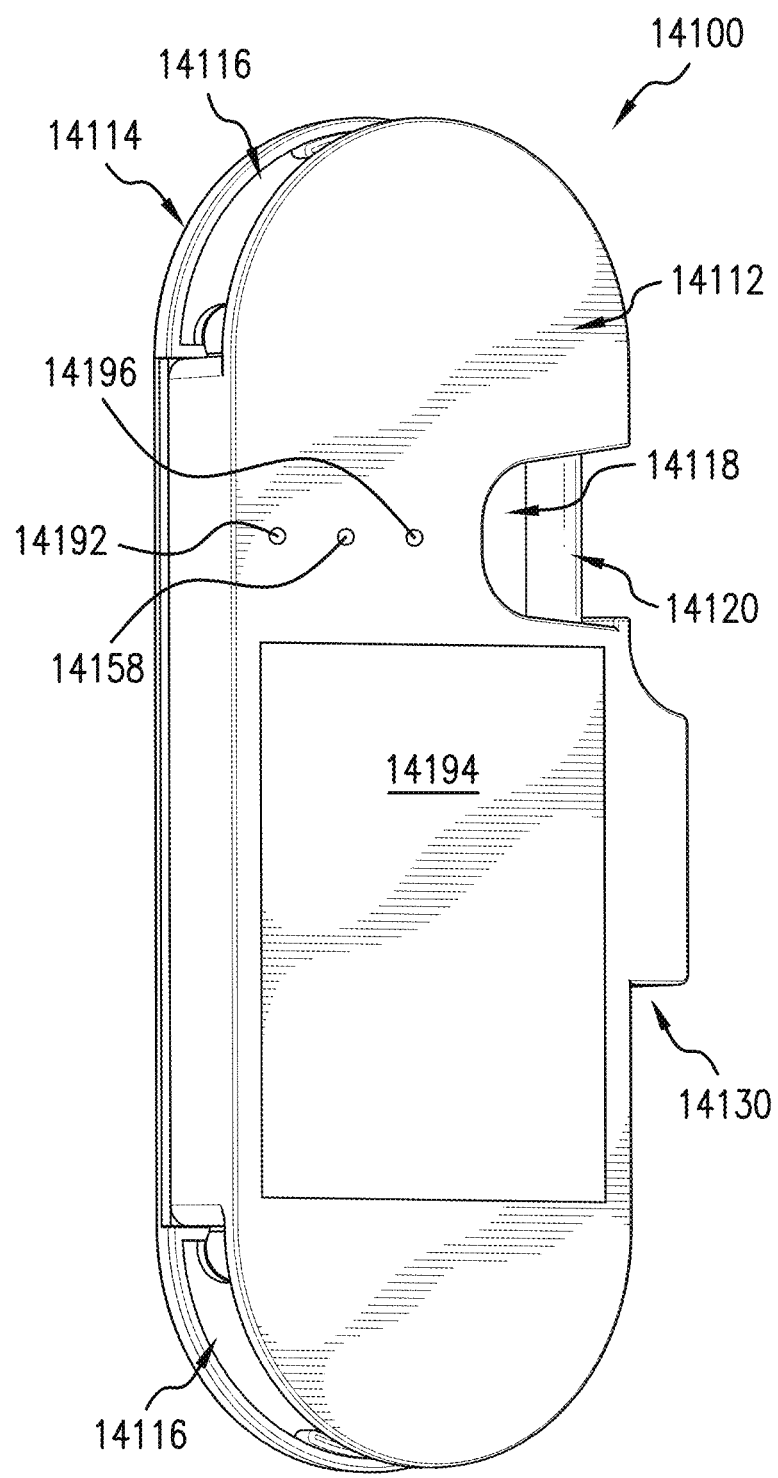
FIGS. 3A-3B show a front perspective view and a back perspective view of the exemplary embodiment of the GPS-equipped locking system of FIGS. 2A-2D without the mounting plate and the security cable.
Figure 3B:
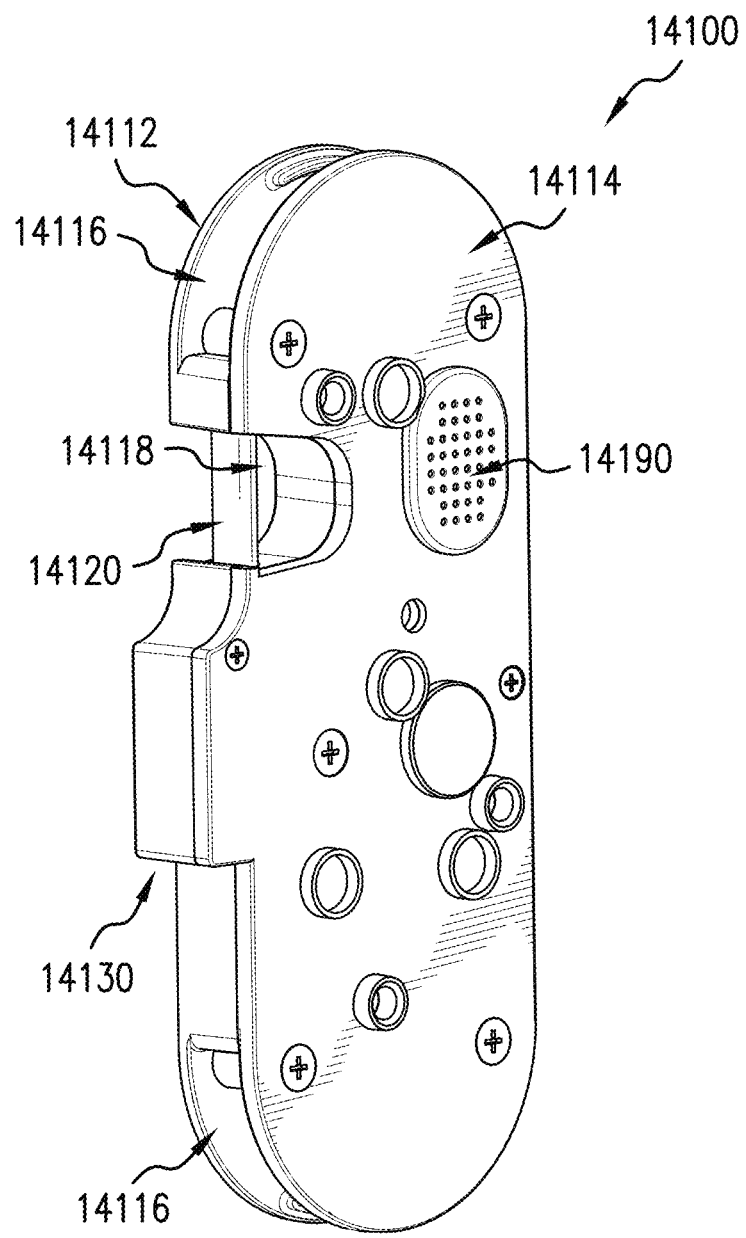

Referring to FIGS. 3A-3B, FIGS. 3A-3B show a front perspective view, and a back perspective view of the exemplary embodiment of the GPS-equipped locking system 14000 of FIGS. 2A-2D, depicting the GPS-equipped lock 14100 without the mounting plate 14200 and without the security cable 14300. The GPS-equipped lock 14100 may include a lock housing/a hardened case 14110 that has a front portion 14112 and a rear portion 14114, which may form a security cable storage slot 14116 and a locking bar alcove 14118 into which the security cable 14300 may be locked; a locking bar 14120 that locks and unlocks access to the locking bar alcove 14118; a locking bar manual actuator 14130 that is adapted to be used to manually lock the locking bar 14120; a locking bar automated motor 14140 that is adapted to automatedly lock and unlock the locking bar 14120; a processor/a microcontroller 14150, which may interface with associated optional electronics, such as a motion sensor/an accelerometer 14152, a rotation sensor/a gyroscope 14154, a temperature sensor 14156, a light sensor 14158; a power source/a battery 14160; a GPS receiver 14170; a wireless transceiver/a cellular communication module 14180; and a speaker/an audio output device 14190, which may also be paired with a sound sensor/a microphone 14192, a visual output device/a screen 14194, and a light 14196, such as a light-emitting diode (LED), that may be a multi-color-capable status light adapted to indicate a status of the GPS-equipped lock.

Figure 4A:
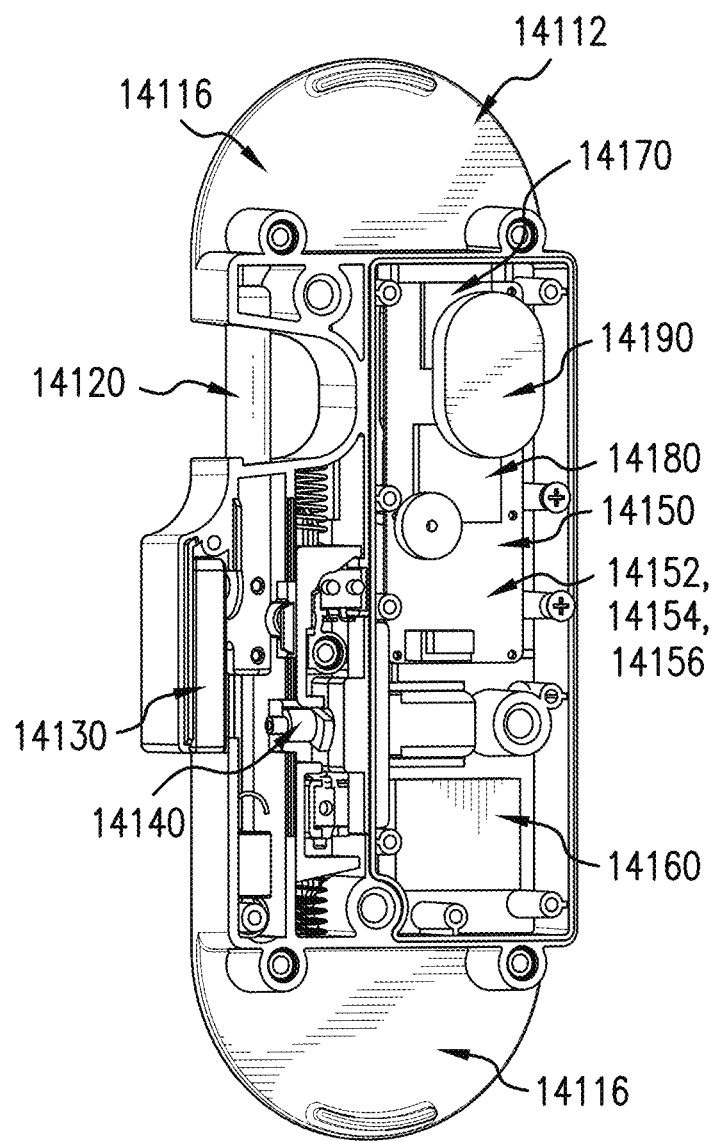
FIGS. 4A-4B show inside perspective views of a front portion and a rear portion of a disassembled housing of the GPS-equipped locking system of the exemplary embodiment of FIGS. 3A-3B.
Figure 4B:
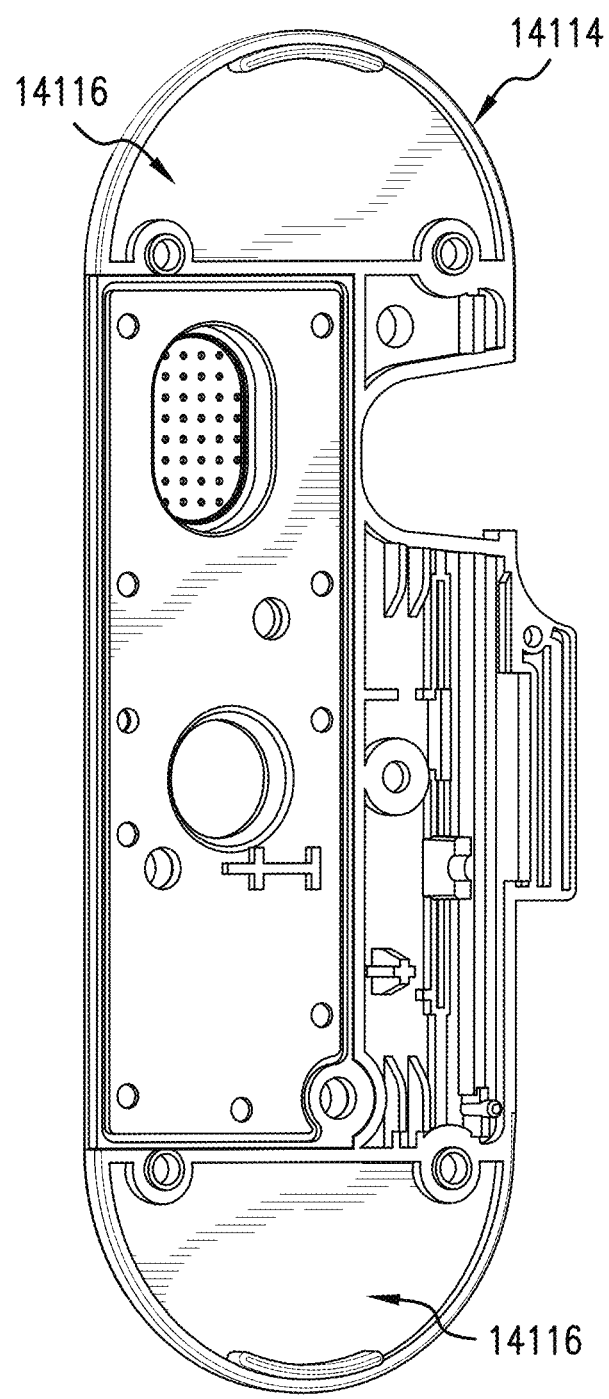

Referring to FIGS. 4A-4B, FIGS. 4A-4B show inside perspective views of the front portion 14112 and the rear portion 14114 of the disassembled housing 14110 of the GPS-equipped locking system 14000 of the exemplary embodiment of FIGS. 3A-3B. Internal components not visible in FIGS. 3A-3B may be seen in FIGS. 4A-4B. For instance, the locking bar manual actuator 14130 is depicted as slid upward into its bay to place the locking bar 14120 in a locked position, as depicted. Were the locking bar 14120 slid downward in an unlocked position, the locking bar manual actuator 14130 likewise would have been slid downward, protruding from the housing 14110, and ready to engage the locking bar 14120 to slide the locking bar 14120 into the locked position. Likewise inside the housing 14110 is the locking bar automated motor 14140, which is adapted to engage the locking bar 14120 to move the locking bar 14120 back and forth between the unlocked position and the locked position. Other internal components include the processor 14150, the motion sensor 14152, the rotation sensor 14154, the temperature sensor 14156, the power source 14160, the GPS receiver 14170, the wireless transceiver 14180, and the speaker 14190. Internal components that have externally visible aspects, shown for example in FIG. 2A, may include the light sensor 14158, the microphone 14192, the screen 14194, and the LED 14196.

Figure 5A:
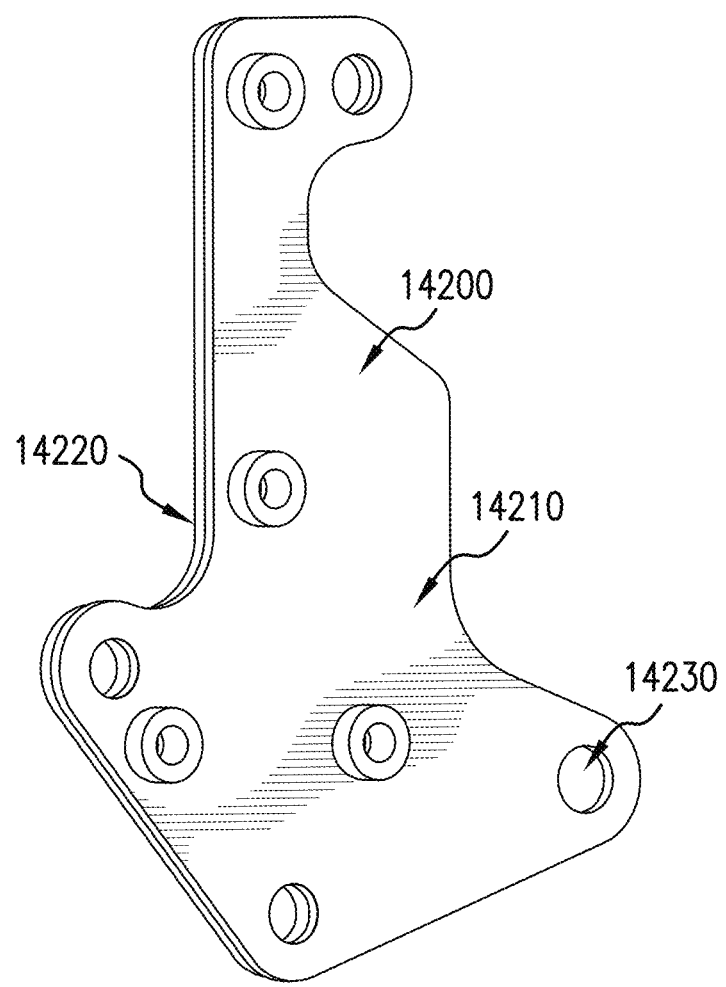
FIGS. 5A-5B show a front perspective view and a back perspective view of a mounting plate of the exemplary embodiment of the GPS-equipped locking system of FIGS. 2A-2D.
Figure 5B:
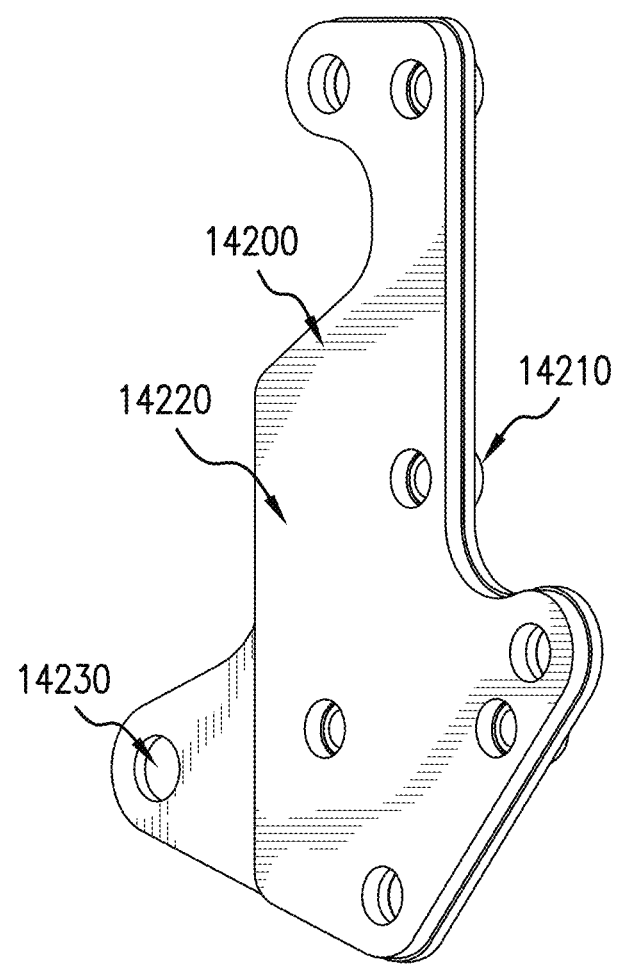

Referring to FIGS. 5A-5B, FIGS. 5A-5B show a front perspective view and a back perspective view of the mounting plate 14200 of the exemplary embodiment of the GPS-equipped locking system 14000 of FIGS. 2A-2D. The mounting plate 14200 may attach to the rear portion 14114 of the GPS-equipped lock 14100 and form an attachment interface with the handle 11000 of the small vehicle 10000, with which the GPS-equipped locking system 14000 may be attached to the handle 11000. The mounting plate 14200 may include a first side 14210, a second side 14220, a security cable anchor hole 14230, and a security cable anchor 14240. The security cable anchor hole 14230 formed in the mounting plate 14200 provides a reasonably strong and secure location to which to attach the security cable anchor 14240 (shown in FIGS. 2A-2D) that is adapted to securely attach the security cable 14300 to the mounting plate 14200 and thereby to the GPS-equipped lock 14100.

Figure 6A:
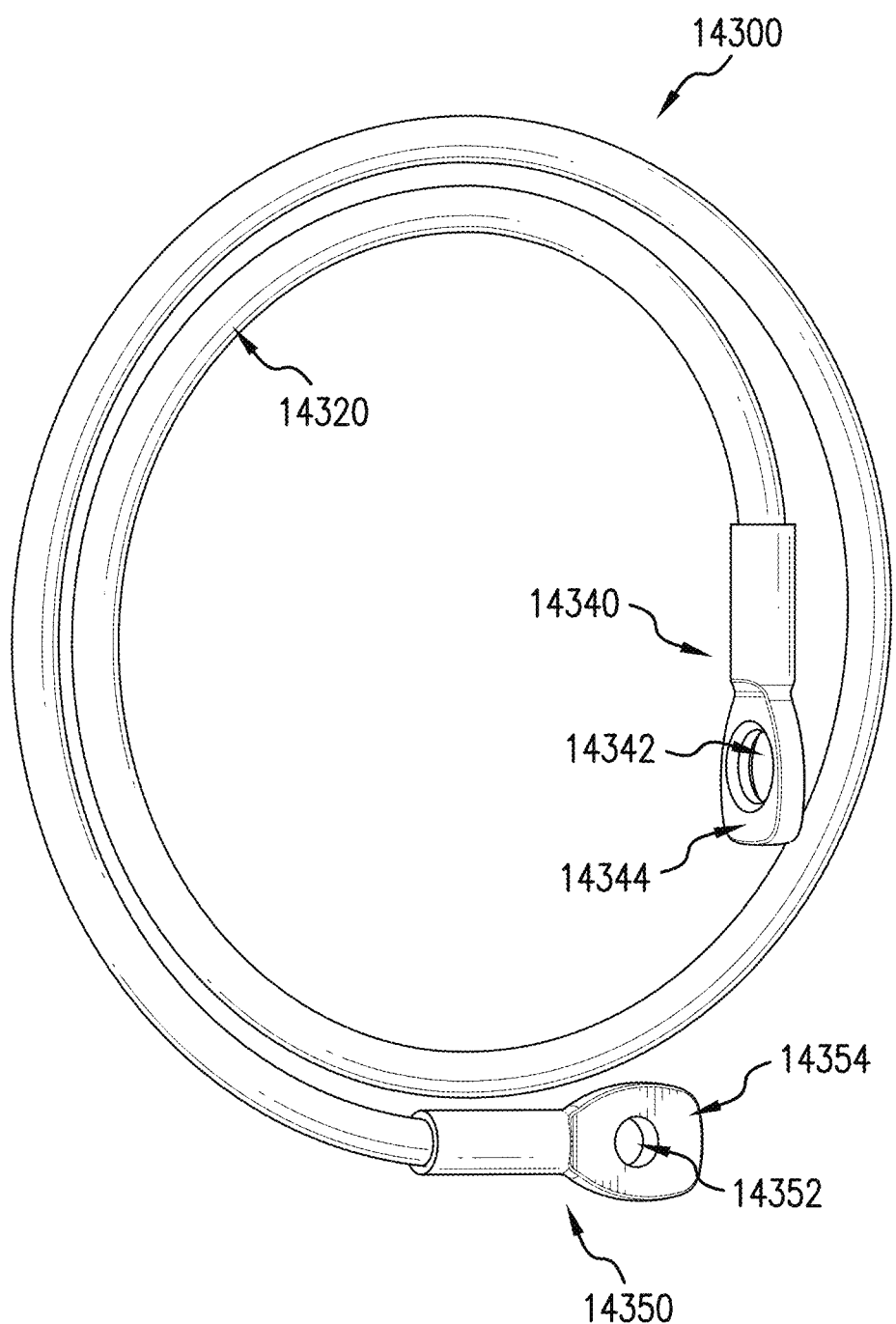
FIGS. 6A-6B show a front perspective view and a rear side perspective exploded view of the security cable of the GPS-equipped locking system of the exemplary embodiment of FIGS. 2A-2D.
Figure 6B:
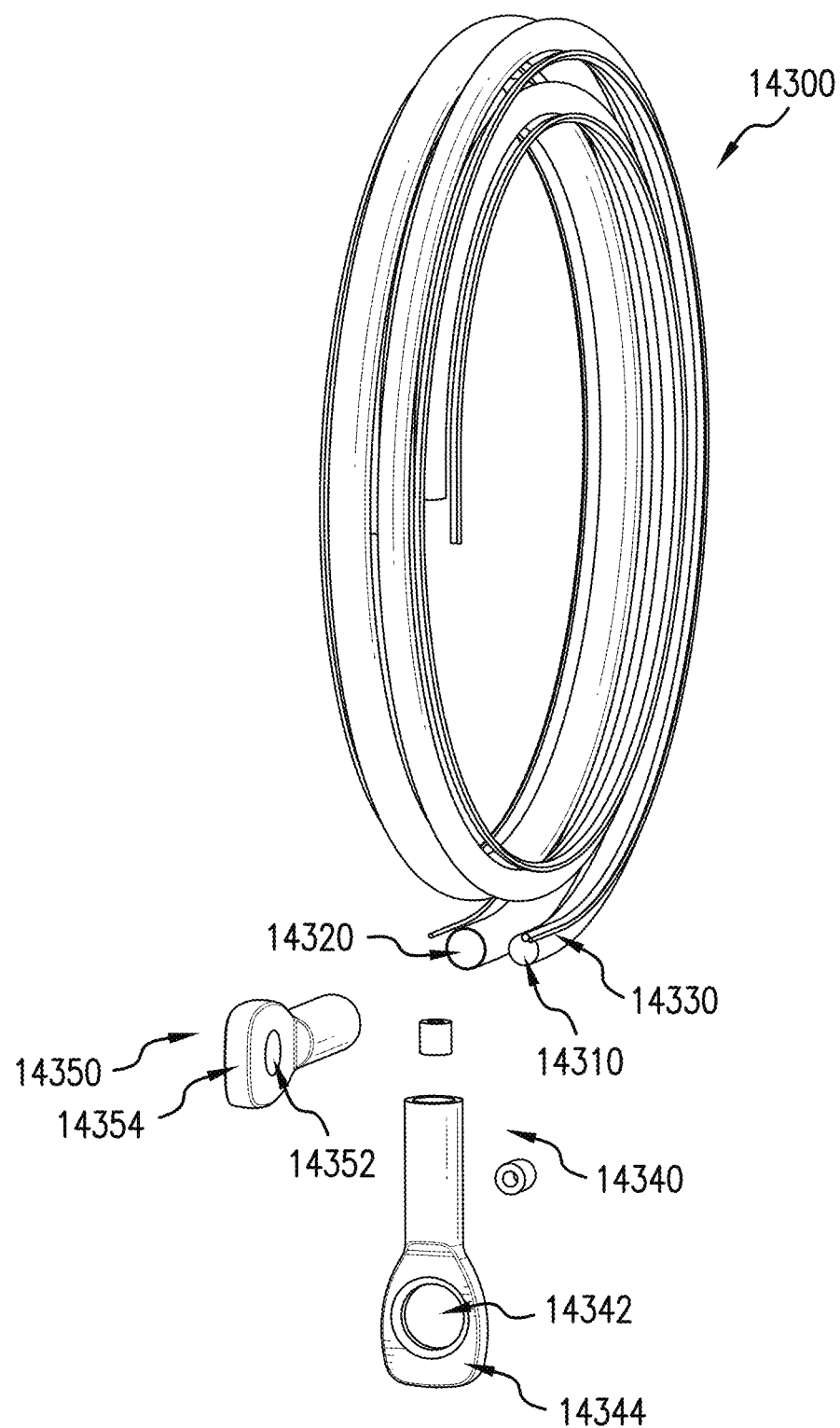

Referring to FIGS. 6A-6B, FIGS. 6A-6B show a front perspective view and a rear side perspective exploded view of the security cable 14300 of the GPS-equipped locking system 14000 of the exemplary embodiment of FIGS. 2A-2D. The security cable 14300 may include a cut-resistant core 14310, a flexible sheath/a plastic sleeve 14320, a hot wire/a cut-detection tripwire 14330, a mounting plate cable end eyelet ferrule 14340, and a locking bar cable end eyelet ferrule 14350. The cut-resistant core 14310, which is depicted inside the sheath 14320 in non-exploded view of FIG. 6A and outside the sheath 14320 in the exploded view of FIG. 6B, may be made, for instance, of hardened, braided steel, and provides most of the theft-resistant strength of the security cable 14300. The flexible sheath 14320 covers the cut-resistant core 14310 and encases one or more hot wires 14330 that may be adapted to detect attempts to cut the security cable 14300. One of the hot wires 14330 also may function as an antenna for the GPS receiver 14170 and/or the wireless transceiver 14180. The mounting plate cable end eyelet ferrule 14340 encloses an end of the security cable 14300 adapted to be attached to the mounting plate 14200 and provides an eyelet opening 14342 in an eyelet body 14344 through which the security cable anchor 14240 may be placed and secured. The eyelet opening 14342 of the mounting plate cable end eyelet ferrule 14340 preferably has a diameter about equal to a diameter of an inner post of the security cable anchor 14240 to allow the security cable anchor 14240 enough space to pass through the eyelet opening 14342, without leaving much additional space. The locking bar cable end eyelet ferrule 14350 encloses an end of the security cable 14300 adapted to be attached to the locking bar 14120 and provides an eyelet opening 14352 in an eyelet body 14354 through which the locking bar 14120 may be placed and closed. The eyelet opening 14352 of the locking bar cable end eyelet ferrule 14350 preferably has a diameter about equal to a diameter of the locking bar 14120 to allow the locking bar 14120 enough space to pass through the eyelet opening 14352, without leaving much additional space. The locking bar cable end eyelet ferrule 14350 preferably is sized to match the locking bar alcove 14118 to allow the eyelet body 14354 to be positioned in the alcove 14118 while the locking bar 14120 is through the eyelet opening 14352.

Methods in accordance with aspects of the invention include, for instance, the steps for unlocking and locking a GPS-equipped locking system for a small vehicle, such as: (1) providing the GPS-equipped locking system for the small vehicle, the system comprising: a GPS-equipped lock having a locking bar adapted to be moved between an unlocked position and a locked position; a mounting plate securely connected to the GPS-equipped lock and adapted to be securely connected the small vehicle; and a security cable having a mounting plate cable end and a locking bar cable end, securely connected to the mounting plate at a mounting plate cable end, and adapted to securely connect to the locking bar when the locking bar is moved into the locked position; wherein the GPS-equipped lock includes: a lock housing that has a front portion and a rear portion that form a locking bar alcove into which the security cable may be locked by the locking bar that locks and unlocks access to the locking bar alcove; a locking bar automated motor that is adapted to automatedly lock and unlock the locking bar; a processor that is adapted to control the locking bar automated motor; a power source coupled to the processor and locking bar automated motor and adapted to power the GPS-equipped lock; a GPS receiver coupled to the processor and adapted to communicate with the processor; and a wireless transceiver coupled to the processor and adapted to communicate with the processor; (2) causing the locking bar to move to the unlocked position by activating the locking bar automated motor to automatedly unlock the locking bar, thereby unlocking the GPS-equipped lock, and thereby unlocking the GPS-equipped locking system; and (3) causing the locking bar to move from the unlocked position to the locked position, thereby locking the GPS-equipped lock, and thereby locking the GPS-equipped locking system. In some embodiments, the steps may include: (4) connecting the locking bar cable end of the security cable to the locking bar by having the locking bar traverse a locking bar cable end eyelet opening while the locking bar is in the unlocked position; and (5) causing the locking bar to move from the unlocked position to the locked position with the locking bar cable end eyelet opening of the security cable traversed by the locking bar, thereby securing a connection of the security cable to the locking bar, thereby locking the GPS-equipped lock, and thereby locking the GPS-equipped locking system. In some embodiments, the steps may include: (4) communicating wirelessly with the wireless transceiver to obtain status information indicating a status of the GPS-equipped lock and to provide instruction information to change the status of the GPS-equipped lock; (5) using the instruction information to change the status of the GPS-equipped lock by moving the locking bar from the unlocked position to the locked position, or moving the locking bar from the locked position to the unlocked position; and (6) updating the status information of the GPS-equipped lock.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is claimed is:

1. A Global Positioning System (GPS)-equipped locking system for securing a small vehicle, the system comprising:
    a GPS-equipped lock having:
        a locking bar adapted to be moved between an unlocked position and a locked position;
        a lock housing that has a front portion and a rear portion that form a locking bar alcove into which a security cable may be locked and unlocked by the locking bar;
        a locking bar automated motor operatively coupled to the locking bar and that is adapted to automatedly move the locking bar between the unlocked position and the locked position;
        a processor operatively coupled to the automated motor and adapted to control the locking bar automated motor;
        a GPS receiver coupled to the processor and adapted to communicate with the processor;
        a wireless transceiver coupled to the processor and adapted to communicate with the processor; and
        a power source operatively coupled to the processor, the locking bar automated motor, the GPS receiver, and the wireless transceiver, and adapted to power the GPS-equipped lock;
    a mounting plate securely coupled to the GPS-equipped lock and adapted to be securely coupled to a small vehicle; and
    the security cable, having a mounting plate cable end and a locking bar cable end, securely coupled to the mounting plate at the mounting plate cable end, and adapted to be removably coupled to the locking bar when the locking bar is moved between the unlocked position and the locked position.

2. The system of claim 1, further comprising:
    a locking bar manual actuator included in the GPS-equipped lock that is adapted to be used to manually lock the locking bar.

3. The system of claim 1, further comprising:
    an audio output device included in the GPS-equipped lock and operatively coupled to the processor and the power source.

4. The system of claim 3, further comprising:
    a microphone included in the GPS-equipped lock and operatively coupled to the processor and the power source.

5. The system of claim 4, further comprising:
    a visual output device with a screen, operatively coupled to the processor.

6. The system of claim 5, further comprising:
    a status light included in the GPS-equipped lock and operatively coupled to the processor and the power source.

7. The system of claim 1, further comprising:
    at least one electronic sensor included in the GPS-equipped lock and operatively coupled to the processor and the power source.

8. The system of claim 7, wherein:
    a first electronic sensor includes a motion sensor, and
    a second electronic sensor includes a rotation sensor.

9. The system of claim 8, wherein:
a third electronic sensor includes a temperature sensor, and
a fourth electronic sensor includes a light sensor.

10. The system of claim 1, wherein:
the security cable includes a cut-resistant core and a flexible sleeve that encases the cut-resistant core, and
the security cable has a mounting plate cable end eyelet ferrule securely coupled to the mounting plate at the mounting plate cable end, and a locking bar cable end eyelet ferrule at the locking bar cable end for securing the cable to the GPS-equipped lock by the locking bar.

11. The system of claim 10, wherein:
the security cable includes a cut-detection tripwire encased by the flexible sleeve, coupled to the processor, adapted to communicate with the processor, and adapted to allow the processor to detect if the cut-detection tripwire has been cut as an indication of the security cable having been cut.

12. The system of claim 1, wherein:
the GPS-equipped lock is adapted to use the wireless transceiver to communicate with a remote computer for communication of status information of the small vehicle and for operation of the GPS-equipped lock based on instructions received from the remote computer.

13. The system of claim 12, wherein:
the remote computer includes a mobile device configured to run an app adapted to operate the GPS-equipped lock.

14. The system of claim 12, wherein:
the remote computer includes a server configured to run software adapted to manage operation of at least one small vehicle.

15. The system of claim 1, wherein:
the small vehicle includes a control pad user interface, and the control pad is adapted to control a functioning of the GPS-equipped locking system.

16. A method for unlocking and locking a GPS-equipped locking system for securing a small vehicle, the method comprising:
providing the GPS-equipped locking system for the small vehicle, the system comprising:
a GPS-equipped lock having:
a locking bar adapted to be moved between an unlocked position and a locked position;
a lock housing that has a front portion and a rear portion that form a locking bar alcove into which a security cable may be locked and unlocked by the locking bar;
a locking bar automated motor operatively coupled to the locking bar and adapted to automatedly move the locking bar between the unlocked position and the locked position;
a processor operatively coupled to the automated motor and adapted to control the locking bar automated motor;
a GPS receiver coupled to the processor and adapted to communicate with the processor;
a wireless transceiver coupled to the processor and adapted to communicate with the processor; and
a power source operatively coupled to the processor, the locking bar automated motor, the GPS receiver, and the wireless transceiver, and adapted to power the GPS-equipped lock;
a mounting plate securely coupled to the GPS-equipped lock and adapted to be securely coupled to a small vehicle; and
the security cable, having a mounting plate cable end and a locking bar cable end, securely coupled to the mounting plate at the mounting plate cable end, and adapted to be removably coupled to the locking bar when the locking bar is moved between the unlocked position and the locked position, and a mounting plate cable end eyelet ferrule securely coupled to the mounting plate at the mounting plate cable end, and a locking bar cable end eyelet ferrule at the locking bar cable end for securing the cable to the GPS-equipped lock by the locking bar;
securely coupling the mounting plate to a small vehicle;
wrapping the security cable around a fixed object;
causing the locking bar to move to the unlocked position by activating the locking bar automated motor to automatedly unlock the locking bar, thereby unlocking the GPS-equipped lock, and thereby unlocking the GPS-equipped locking system; and
causing the locking bar to move through the locking bar cable end eyelet from the unlocked position to the locked position, thereby locking the GPS-equipped lock, and thereby locking the GPS-equipped locking system to secure the small vehicle to the fixed object.

17. The method of claim 16, further comprising:
communicating wirelessly via the wireless transceiver to:
provide status information indicating a status of the GPS-equipped lock; and
receive instruction information to change the status of the GPS-equipped lock;
changing the status of the GPS-equipped lock by performing one of:
moving the locking bar from the unlocked position to the locked position, and moving the locking bar from the locked position to the unlocked position, in accordance with the received instruction information; and
updating the status information of the GPS-equipped lock.

18. A small vehicle comprising:
a handle including a control pad and a handle stem, the control pad having a hand grip;
a foot deck connected to and supporting a lower end of the handle;
a chassis connected to and supporting the foot deck, the chassis including a plurality of axles, a plurality of wheels, a suspension system, and a braking system; and
a GPS-equipped locking system;
wherein the GPS-equipped locking system comprises:
a GPS-equipped lock having a locking bar adapted to be moved between an unlocked position and a locked position;
a mounting plate securely connected to the GPS-equipped lock and securely connected to the small vehicle; and
a security cable having a mounting plate cable end and a locking bar cable end, securely connected to the mounting plate at the mounting plate cable end, and adapted to be removably coupled to the locking bar when the locking bar is moved between the unlocked position and the locked position;
wherein the GPS-equipped lock includes:
a lock housing that has a front portion and a rear portion that form a locking bar alcove into which the security cable may be locked and unlocked by the locking bar;

a locking bar automated motor operatively coupled to the locking bar and adapted to automatedly move the locking bar between the unlocked position and the locked position;
a processor operatively coupled to the automated motor and adapted to control the locking bar automated motor;
  a GPS receiver coupled to the processor and adapted to communicate with the processor;
  a wireless transceiver coupled to the processor and adapted to communicate with the processor; and
  a power source operatively coupled to the processor, the locking bar automated motor, the GPS receiver, and the wireless transceiver, and adapted to power the GPS-equipped lock.

19. The small vehicle of claim 18, further comprising:

a small vehicle control user interface system located in the handle;

at least one motor located in the chassis;

wherein the small vehicle control user interface is operatively coupled to the motor and the braking system, and is adapted to control the motor and the braking system; and wherein the small vehicle control user interface system includes at least one sensor, at least one processor, at least one control input device, a power source, and a communication device.

\* \* \* \* \*